(12) United States Patent
Takahashi

(10) Patent No.: US 9,914,330 B2
(45) Date of Patent: Mar. 13, 2018

(54) RUN FLAT TIRE AND METHOD FOR PRODUCING SAME

(71) Applicant: Toyo Tire & Rubber Co., Ltd., Osaka-shi, Osaka (JP)

(72) Inventor: Hiroyuki Takahashi, Osaka (JP)

(73) Assignee: TOYO TIRE & RUBBER CO., LTD., Osaka-shi (JP)

( * ) Notice: Subject to any disclaimer, the term of this patent is extended or adjusted under 35 U.S.C. 154(b) by 177 days.

(21) Appl. No.: 14/702,904

(22) Filed: May 4, 2015

(65) Prior Publication Data
US 2015/0343854 A1 Dec. 3, 2015

(30) Foreign Application Priority Data
May 30, 2014 (JP) ................. 2014-112864

(51) Int. Cl.
*B60C 1/00* (2006.01)
*B60C 17/00* (2006.01)
*B60C 15/00* (2006.01)
*B29D 30/72* (2006.01)

(52) U.S. Cl.
CPC .......... *B60C 17/0009* (2013.01); *B29D 30/72* (2013.01); *B29D 2030/724* (2013.01); *B60C 1/0041* (2013.01); *B60C 2001/0033* (2013.01); *B60C 2017/0063* (2013.01)

(58) Field of Classification Search
CPC ...... B60C 1/0041; B60C 17/00; B60C 17/009
See application file for complete search history.

(56) References Cited

U.S. PATENT DOCUMENTS

| 5,131,445 A | 7/1992 | Tokieda et al. |
| 5,253,691 A | 10/1993 | Scriver |

(Continued)

FOREIGN PATENT DOCUMENTS

| CN | 101407603 A | 4/2009 |
| CN | 101484311 A | 7/2009 |

(Continued)

OTHER PUBLICATIONS

Machine translation of JP 2012-25017, 2012.*

(Continued)

*Primary Examiner* — Justin R Fischer
(74) *Attorney, Agent, or Firm* — Westerman, Hattori, Daniels & Adrian, LLP

(57) ABSTRACT

A run flat tire having a side reinforcing rubber part is disclosed. The side reinforcing rubber part is formed by a rubber composition having a ratio (M50H/M50N) of tensile stress (M50H) in 50% elongation at a measurement temperature of 100° C. to tensile stress (M50N) in 50% elongation at a measurement temperature of 23° C. of from 1.0 to 1.3. Ratio ($t_{b10}/t_{p10}$) of 10% vulcanization time ($t_{b10}$) at a vulcanization temperature of 160° C. of a rubber composition for a bead filler to 10% vulcanization time ($t_{p10}$) at a vulcanization temperature of 160° C. of a rubber composition for a covering rubber of a carcass ply is from 0.5 to 1.0.

14 Claims, 1 Drawing Sheet

(56) References Cited

U.S. PATENT DOCUMENTS

| | | | | |
|---|---|---|---|---|
| 5,464,899 A | * | 11/1995 | Freeman | B60C 1/0025 |
| | | | | 152/517 |
| 5,859,101 A | * | 1/1999 | Kikkawa | C08K 5/092 |
| | | | | 524/103 |
| 6,196,289 B1 | | 3/2001 | Yoshioka | |
| 6,494,242 B2 | | 12/2002 | Cottrell | |
| 7,900,667 B2 | | 3/2011 | Vasseur | |
| 2006/0219343 A1 | | 10/2006 | Hochi | |
| 2008/0295941 A1 | | 12/2008 | Shiraishi | |
| 2009/0095394 A1 | | 4/2009 | Kameda | |
| 2010/0112365 A1 | | 5/2010 | Obrecht et al. | |
| 2011/0172339 A1 | | 7/2011 | Satou | |
| 2011/0290396 A1 | | 12/2011 | Nakagawa et al. | |
| 2012/0152425 A1 | | 6/2012 | Kawashima et al. | |
| 2013/0037193 A1 | | 2/2013 | Horiuchi | |
| 2013/0158163 A1 | | 6/2013 | Yagi et al. | |
| 2014/0034206 A1 | | 2/2014 | Mizuno | |
| 2015/0306921 A1 | | 10/2015 | Hiraiwa | |

FOREIGN PATENT DOCUMENTS

| | | | |
|---|---|---|---|
| CN | 102264552 A | | 11/2011 |
| CN | 103124765 A | | 5/2013 |
| CN | 103374151 A | | 10/2013 |
| JP | S58-122946 A | | 7/1983 |
| JP | H03-176213 A | | 7/1991 |
| JP | 4-185512 A | | 7/1992 |
| JP | 2001-80319 A | | 3/2001 |
| JP | 2004-276699 A | | 10/2004 |
| JP | 2007-70373 A | | 3/2007 |
| JP | 2007-331422 A | | 12/2007 |
| JP | 2008-189911 A | | 8/2008 |
| JP | 2010-132168 A | | 6/2010 |
| JP | 2010-149632 A | | 7/2010 |
| JP | 2010-285514 A | | 12/2010 |
| JP | 2011-89031 A | | 5/2011 |
| JP | 2011-190410 A | | 9/2011 |
| JP | 2012-251017 | * | 12/2012 |
| JP | 2012-251017 A | | 12/2012 |
| JP | 2013-23651 A | | 2/2013 |
| JP | 2013-216753 A | | 10/2013 |
| JP | 2013-221052 A | | 10/2013 |
| JP | 2013-224054 A | | 10/2013 |
| JP | 2014-31400 A | | 2/2014 |
| WO | 2010/074286 A1 | | 7/2010 |

OTHER PUBLICATIONS

Office Action dated Sep. 30, 2016, issued in counterpart Chinese Application No. 201510289327.X, with English translation. (10 pages).

Office Action dated Jun. 29, 2016, issued in Chinese Patent Application 201510159519.9, with abridged English translation. (10 pages).

Office Action dated Nov. 22, 2016, issued in Chinese Application No. 201510419572.8, with machine tranlsation. (10 pages).

Non-Final Office Action dated Apr. 8, 2016, issued in U.S. Appl. No. 14/813,525 (10 pages).

Non-Final Office Action dated Mar. 3, 2017, issued in U.S. Appl. No. 14/721,442 (6 pages).

Non-Final Office Action dated Mar. 13, 2017, issued in U.S. Appl. No. 14/750,265 (8 pages).

Non-Final Office Action dated Apr. 6, 2017, issued in U.S. Appl. No. 14/813,525 (8 pages).

Final Office Action dated Sep. 28, 2016, issued in U.S. Appl. No. 14/813,525 (10 pages).

Non-Final Office Action dated Feb. 21, 2017, issued in U.S. Appl. No. 14/669,561 15 pages.

Final Office Action dated Jun. 7, 2017, issued in U.S. Appl. No. 14/669,561 (13 Pages).

Office Action dated Jul. 18, 2017, issued in Japanese Patent Application No. 2014-090478, with English machine tanslation. (9 pages).

Final Office Action dated Jul. 18, 2017, issued in U.S. Appl. No. 14/721,442 (13 pages).

Notice of Allowance dated Aug. 2, 2017, issued in U.S. Appl. No. 14/813,525 (13 pages).

Notice of Allowance dated Jul. 14, 2017, issued in U.S. Appl. No. 14/750,265 (19 pages).

Office Action dated Aug. 8, 2017, issued in Chinese Patent Application 201510419572.8, with machine translation. (12 pages).

Non-Final Office Action dated Oct. 26, 2017, issued in U.S. Appl. No. 14/721,442 (14 pages).

Notice of Allowance dated Dec. 15, 2017, issued in U.S. Appl. No. 14/721,442 (14 pages).

Non-Final Office Action dated Dec. 1, 2017, issued in U.S. Appl. No. 14/669,561 (10 pages).

Office Action dated Dec. 26, 2017, issued in counterpart Japanese Application No. 2014-158030, with English translation (11 pages).

* cited by examiner

RUN FLAT TIRE AND METHOD FOR PRODUCING SAME

CROSS-REFERENCE TO RELATED APPLICATIONS

This application is based upon and claims the benefit of priority from the prior Japanese Patent Application No. 2014-112864, filed on May 30, 2014; the entire contents of which are incorporated herein by reference.

BACKGROUND

1. Technical Field

The present invention relates to a run flat tire and a method for producing the same.

2. Related Art

There is a pneumatic tire called a run flat tire that can run in a certain extent of distance even in the state that air pressure in a tire has reduced and reached 0 kPa by tire failure such as puncture. It is known to reinforce a side wall part by providing a side reinforcing rubber part on an inner surface of the side wall part as a technique for enabling run flat running in the state that an inner pressure has reduced as above (for example, see US2006/0219343A1 and JP-A-2008-189911).

In a run flat tire of such a side reinforcing type, high rigidity rubber is used in a side reinforcing rubber part to suppress deformation of a tire during run flat running. However, a temperature of a side reinforcing rubber part is increased during run flat running, and as a result, rigidity of the side reinforcing rubber part is decreased, resulting in decrease of run flat durability. On the other hand, where decrease of rigidity of a side reinforcing rubber part at high temperature is suppressed, stress applied to a bead part is increased during run flat running, and strain in the bead part is increased. For this reason, separation occurs between bead filler and a carcass ply, and run flat durability is sometimes decreased.

JP-A-2004-276699 and WO2010/074286 disclose that to suppress peeling between a side reinforcing rubber part and an inner liner layer during run flat running, covulcanizability is improved by specifying the difference of vulcanization rate between those. Furthermore, US2008/0295941A1 discloses that to suppress peeling between a side reinforcing rubber part and a carcass ply, a rubber sheet having an intermediate vulcanization rate is arranged between those. However, JP-A-2004-276699 and WO2010/074286 focus on vulcanization rate calculated from the difference between 90% vulcanization time and 10% vulcanization time, and do not intend to improve run flat durability by focusing on time until initiation of vulcanization. Furthermore, those three patent documents do not disclose to specify vulcanization time between bead filler and a carcass ply in order to suppress fracture of a bead part during run flat running.

SUMMARY

The present invention has an object to provide a run flat tire having excellent run flat durability.

(1) A run flat tire according to the present embodiment comprises a tread part, a pair of side wall parts extending inside in a radial direction from both ends of the tread part, a pair of bead parts provided inside in a radial direction of the side wall part, a pair of ring-shaped bead cores provided in the bead parts, a carcass ply comprising a carcass cord and a covering rubber, extending in a toroidal shape between a pair of the bead cores, a bead filler provided on the periphery of the bead cores, and a side reinforcing rubber part provided in the side wall part and reinforcing the side wall part.

(2) In the run flat tire, the side reinforcing rubber part is formed by a rubber composition in which a ratio (M50H/M50N) of tensile stress (M50H) in 50% elongation at a measurement temperature of 100° C. to tensile stress (M50N) in 50% elongation at a measurement temperature of 23° C. is from 1.0 to 1.3. Furthermore, a ratio $(t_{b10}/t_{p10})$ of 10% vulcanization time $(t_{b10})$ at a vulcanization temperature of 160° C. of a rubber composition for the bead filler to 10% vulcanization time $(t_{p10})$ at a vulcanization temperature of 160° C. of a rubber composition for the covering rubber of the carcass ply is from 0.5 to 1.0.

(3) A production method according to the present embodiment is a method for producing the run flat tire described in (1) above, and comprises preparing an unvulcanized side reinforcing rubber member using a rubber composition having, as a vulcanized rubber property, a ratio (M50H/M50N) of tensile stress (M50H) in 50% elongation at a measurement temperature of 100° C. to tensile stress (M50N) in 50% elongation at a measurement temperature of 23° C. of from 1.0 to 1.3, preparing an unvulcanized carcass ply member and an unvulcanized bead filler member using a rubber composition for the covering rubber and a rubber composition for the bead filler, satisfying that when 10% vulcanization times at a vulcanization temperature of 160° C. of the rubber composition for the covering rubber and the rubber composition for the bead filler are $t_{p10}$ and $t_{b10}$, respectively, a ratio $(t_{b10}/t_{p10})$ of those is from 0.5 to 1.0, forming a green tire using the side reinforcing rubber member, the carcass ply member and the bead filler member, and vulcanization molding the green tire.

DETAILED DESCRIPTION

Figure 1:
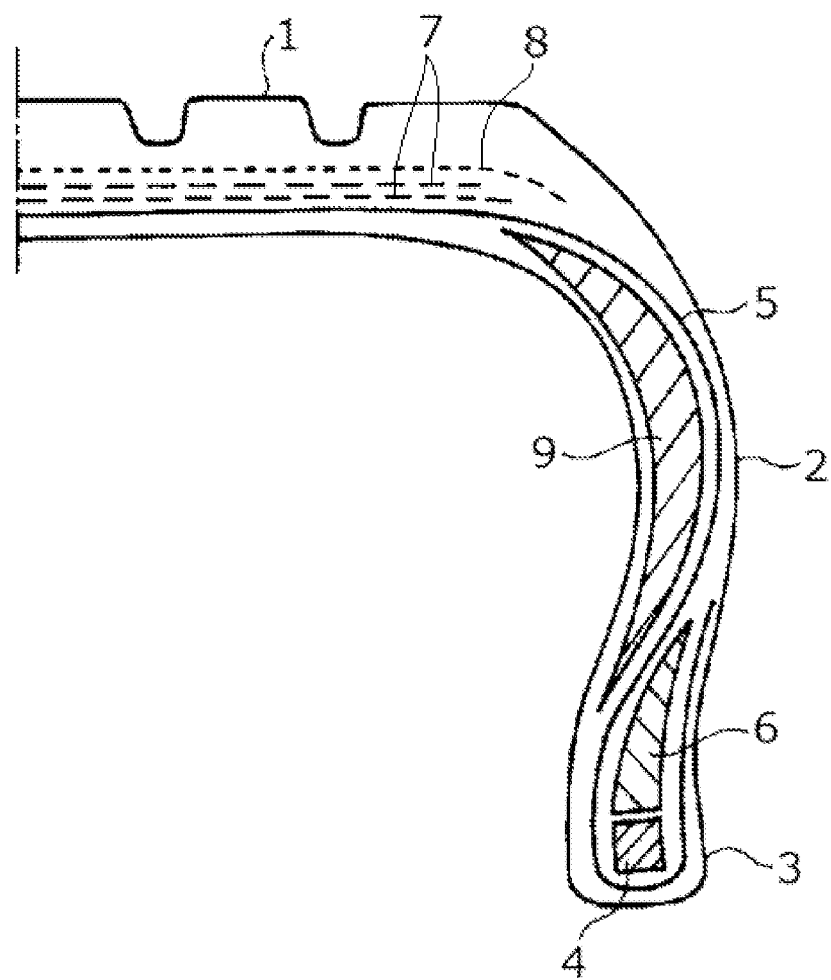
FIG. 1 is a half cross-sectional view of a run flat tire according to one embodiment.

As shown in FIG. 1, the run flat tire according to one embodiment is a pneumatic radial tire for passenger cars, and comprises a tread part (1), a pair of left and right side wall parts (2) extending inside in a radial direction from both ends of the tread part, and a pair of left and right bead parts (3) provided inside in a radial direction of the side wall part (2). Ring-shaped bead cores (4) are embedded in a pair of bead parts (3), respectively. In FIG. 1, CL indicates a tire equator. In this embodiment, the tire has a left-right symmetrical structure to the tire equator CL.

At least one carcass ply (5) extending in a toroidal shape between a pair of the bead cores (4) is embedded in the tire. In this embodiment, one carcass ply (5) is used, but two or more carcass plies may be provided. The carcass ply (5) extends to the bead part (3) via the side wall part (2) from the tread part (1), and is locked by folding the end of the carcass ply (5) around the bead core (4) in the bead part (3). In this embodiment, the end of the carcass ply (5) is locked by folding outside from the inside in a tire width direction around the bead core (4). The carcass ply (5) comprises a carcass cord comprising an organic fiber cord or the like, and a covering rubber for covering the carcass cord. The carcass cord is arranged at substantially right angle to a tire circumferential direction. An inner liner layer (6) for maintaining air pressure is provided at a tire inner surface side of the carcass ply (5).

Bead filler (7) made of hard rubber is provided on the periphery (that is, periphery side in a radial direction) of the bead core (4) between a main part (5A) and a folded part (5B) of the carcass ply (5). The bead filler (7) has a triangular cross-sectional shape formed such that its width is gradually narrowed toward an outer side in a radial direction.

Side reinforcing rubber parts (8) called side pads are provided in a pair of the side wall parts (2), respectively, in order to increase its rigidity. The side reinforcing rubber part (8) is provided at a tire inner surface side of the carcass ply (5) in the side wall part (2), and in this embodiment, is sandwiched between the carcass ply (5) and the inner liner layer (6). The side reinforcing rubber part (8) is formed such that the thickness thereof is large at a central part in a radial direction of the side wall part (2) and the thickness is gradually decreased toward the tread part (1) side and the bead part (3) side from the central part, respectively, and has a crescent cross-sectional shape in a tire meridian cross-section as shown in FIG. 1.

The side reinforcing rubber part (8) extends inside in a radial direction over a tip (that is, outer edge in a radial direction) of the bead filler (7). Therefore, the side reinforcing rubber part (8) and the bead filler (7) overlap with each other in a tire radial direction, and the side reinforcing rubber part (8) and the bead filler (7) are adjacent to each other sandwiching the main part (5A) of the carcass ply (5) therebetween.

Belt (10) comprising at least two belt plies is provided between the carcass ply (5) and a tread rubber part (9) at the periphery side in a radial direction of the carcass ply (5) in the tread part (1). Furthermore, a belt reinforcing layer (11) is provided at the periphery side of the belt (10)

In the run flat tire according to the present embodiment, the side reinforcing rubber part (8) for reinforcing the side wall part (2) is formed using a rubber composition having noble properties that improve run flat durability. In the rubber composition, when tensile stress in 50% elongation at a measurement temperature of 23° C. is M50N and tensile stress in 50% elongation at a measurement temperature of 100° C. is M50H, M50H/M50N that is a ratio of those satisfies the following relationship. That is, in the rubber composition constituting the side reinforcing rubber part (8) properties of a vulcanized rubber satisfy the following relationship.

$$1.0 \leq M50H/M50N \leq 1.3$$

When the rubber composition having the above properties is used, the side reinforcing rubber part (8) having the same properties is obtained, deformation of a side wall part during run flat running is suppressed while maintaining running performance (for example, running performance to run over a rut) during normal running, and run flat durability can be improved.

In detail, modulus of elasticity is decreased at high temperature in a high hardness compounded rubber composition generally used in a side reinforcing rubber part of a run flat tire. Inverting this relationship, a rubber composition in which tensile stress at high temperature (100° C.) corresponding to a temperature during run flat running is the same as or more than tensile stress at ordinary temperature (23° C.) corresponding to a temperature during normal running is used in the present embodiment. When M50H/M50N is 1.0 or more, decrease of rigidity during run flat running is suppressed, and run flat durability can be improved. More preferably, tensile stress at high temperature is higher than tensile stress at ordinary temperature, that is, M50H/M50N>1.0, and still more preferably, M50H/M50N is 1.1 or more. On the other hand, where M50H/M50N is too large, rigidity at high temperature becomes too high, and run flat durability is rather deteriorated. Therefore, M50H/M50N is preferably less than 1.3, and more preferably 1.2 or less.

When the tensile stress (M50H) in 50% elongation at a measurement temperature of 100° C. of the rubber composition forming a side reinforcing rubber part is 3.5 MPa or more, it is preferred in that rigidity of a side wall part at high temperature is increased, thereby improving run flat durability. The lower limit of M50H is more preferably 4.0 MPa or more. The upper limit of M50H is not particularly limited, but is preferably 5.5 MPa or less, and more preferably 5.3 MPa or less. Setting M50H to the above upper limit suppresses the phenomenon that rigidity at high temperature is too high and a side wall part becomes difficult to warp. As a result, run flat durability can be improved. Tensile stress (M50N) in 50% elongation at a measurement temperature of 23° C. of the rubber composition is not particularly limited. However, to maintain running performance during normal running in good state, the tensile stress is preferably from 3.0 to 5.0 MPa. More preferably, the lower limit is 3.5 MPa or more, and the upper limit is 4.5 MPa or less.

Various rubber compositions comprising a blend of a rubber component comprising a diene rubber, and a filler, and having the above-described properties of a vulcanized rubber can be used in the side reinforcing rubber part (8). The rubber composition for a side reinforcing rubber part according to one embodiment comprises a rubber component containing natural rubber (NR) and polybutadiene rubber (BR), a phenol type thermosetting resin and a methylene donor as its hardener, and a mass ratio of the amount of the phenol type thermosetting resin to the amount of the methylene donor is 1.5 times or more.

The natural rubber and polybutadiene rubber as the rubber component are not particularly limited and rubbers generally used in rubber industries can be used as the natural rubber and polybutadiene rubber. Ratio of those rubbers contained in the rubber component is not particularly limited, and for example, the content of the natural rubber may be from 20 to 70 mass %, and may be from 30 to 60 mass %. The content of the polybutadiene rubber may be from 30 to 80 mass %, and may be from 40 to 70 mass %. Tear resistance can be improved by increasing the content of natural rubber. Bending fatigue resistance can be improved by increasing the content of polybutadiene rubber. The rubber component may be constituted of only natural rubber and polybutadiene rubber, and may contain other diene rubber. The other diene rubber is not particularly limited, and examples thereof include styrene-butadiene rubber (SBR), acrylonitrile-butadiene rubber (NBR) and chloroprene rubber (CR).

Examples of the phenol type thermosetting resin used include thermosetting resins obtained by condensation of at least one phenol compound selected from the group consisting of phenol, resorcin and those alkyl derivatives with aldehyde such as formaldehyde, and use of the resin can help to increase hardness. The alkyl derivatives include derivatives by relatively long-chain alkyl group, such as nonyl phenol or octyl phenol, in addition to methyl group derivatives such as cresol or xylenol. Specific examples of the phenol type thermosetting resin include various novolac type phenol resins such as an unmodified phenol resin obtained by condensation of phenol and formaldehyde (straight phenol resin), an alkyl-substituted phenol resin obtained by condensation of an alkyl phenol such as cresol, xylenol or octyl phenol and formaldehyde, a resorcin-formaldehyde resin obtained by condensation of resorcin and formaldehyde, and a resorcin-alkyl phenol copolycondensated formaldehyde resin obtained by condensation of resorcin, alkyl phenol and formaldehyde. Furthermore, for example, an oil-modified novolac type phenol resin obtained by modification with at least one oil selected from the group consisting of a cashew nutshell oil, a tall oil, a rosin oil, a linoleic acid oil, oleic acid and linolenic acid can be used. Those phenol type thermosetting reins may be used in any one kind alone and may be used as mixtures of two or more kinds.

Hexamethylenetetramine and/or melamine derivative are used as the methylene donor contained as a hardener of the phenol type thermosetting resin. The melamine derivative includes at least one selected from the group consisting of hexamethoxymethylmelamine, hexamethylolmelamine pentamethyl ether and polyhydric methylolmelamine. Of those, hexamethoxymethylmelamine and/or hexamethylenetetramine are preferred as the methylene donor, and hexamethoxymethylmelamine is more preferred.

The amount (A) of the phenol type thermosetting resin added is A/B≥1.5 in terms of a mass ratio to the amount (B) of the methylene donor added. When the proportion of the methylene donor as a hardener is too large, the proportion may adversely affect crosslinking system of a rubber. When those are used in appropriate amounts, M50H/M50N ratio is easily set to the above range, the effect of suppressing deformation of a tire during run flat running is increased, and run flat durability can be improved. A/B is more preferably 2.0 or more, and still more preferably 2.5 or more. The upper limit of A/B is preferably 7.0 or less, more preferably 5.0 or less, and still more preferably 4.0 or less.

The amount of the phenol type thermosetting resin added is not particularly limited, but is preferably from 1 to 20 parts by mass, and more preferably from 1 to 10 parts by mass, per 100 parts by mass of the rubber component. The amount of the methylene donor added is not particularly limited, but is preferably from 0.2 to 10 parts by mass, and more preferably from 0.5 to 5 parts by mass, per 100 parts by mass of the rubber component.

The rubber composition for a side reinforcing rubber part may contain a quinoline type age resister and at least one age resister other than the quinoline type age resister. When two or more kinds of those age resisters are added, run flat durability can be improved.

The quinoline type age resister includes at least one selected from the group consisting of a 2,2,4-trimethyl-1,2-dihydroquinoline polymer (TMDQ) and 6-ethoxy-2,2,4-trimethyl-1,2-dihydroquinoline (ETMDQ).

Other age resister used together with the quinoline type age resister includes at least one age resister selected from the group consisting of an aromatic secondary amine type age resister, a phenol type age resister, a sulfur type age resister and a phosphite type age resister.

Examples of the aromatic secondary amine type age resister include p-phenylenediamine type age resisters such as N-phenyl-N'-(1,3-dimethylbutyl)-p-phenylenediamine (6PPD), N-isopropyl-N'-phenyl-p-phenylenediamine (IPPD), N,N'-diphenyl-p-phenylenediamine (DPPD), N,N'-di-2-naphthyl-p-phenylenediamine (DNPD), N-(3-methacryloyloxy-2-hydroxypropyl)-N'-phenyl-p-phenylenediamine or N-cyclohexyl-N'-phenyl-p-phenylenediamine; diphenylamine type age resisters such as p-(p-toluenesulfonylamide)diphenylamine, 4,4'-bis(α,α-dimethylbenzyl)diphenylamine (CD), octylated diphenylamine (ODPA) or styrenated diphenylamine; and naphthylamine type age registers such as N-phenyl-1-naphthylamine (PAN) or N-phenyl-2-naphthylamine (PBN). Those can be used in one kind alone or as mixtures of two or more kinds.

Examples of the phenol type age resisters include monophenol type age resisters such as 2,6-di-tert-butyl-4-methylphenol (DTBMP) or styrenated phenol (SP); bisphenol type age resisters such as 2,2'-methylene-bis(4-methyl-6-tert-butylphenol) (MBMBP), 2,2'-methylene-bis(4-ethyl-6-tert-butylphenol) (MBETB), 4,4'-butylidene-bis(3-methyl-6-tert-butylphenol) (BBMTBP) or 4,4'-thio-bis(3-methyl-6-tert-butylphenol) (TBMTBP); and hydroquinone type age resisters such as 2,5-di-tert-butylhydroquinone (DBHQ) or 2,5-di-tert-amylhydroquinone (DAHQ). Those can be used in one kind alone or as mixtures of two or more kinds.

Examples of the sulfur type age resister include benzimidazole type age resisters such as 2-mercaptobenzimidazole, 2-mercaptomethylbenzimidazole or a zinc salt of 2-mercaptobenzimidazole; dithiocarbamate type age resisters such as nickel dibutylthiocarbamate; thiourea type age resisters such as 1,3-bis(dimethylaminopropyl)-2-thiourea or tributylthiourea; and organic thioacid type age resisters such as dilauryl thiodipropionate. The phosphite type age resister includes tris(nonylphenyl)phosphite. Those can be used in one kind alone or as mixtures of two or more kinds.

Of the above, the aromatic secondary amine type age resister is preferred as the other age resister used together with the quinoline type age resister, and p-phenylenediamine type age resister is more preferred.

The amount of the quinoline type age resister added is preferably 20 mass % or more based on the total amount of the age resisters, and improvement effect of run flat durability can be increased. The amount is more preferably 25 mass % or more, and still more preferably 30 mass % or more. The upper limit of the amount is preferably 80 mass % or less, and more preferably 75 mass % or less. The total amount of the age resisters added, that is, the total of the amount of the quinoline type age resister and the amount of the other age resister, is preferably from 1 to 10 parts by mass, more preferably from 1.5 to 7 parts by mass, and still more preferably from 2 to 5 parts by mass, per 100 parts by mass of the rubber component. The amount of the quinoline type age resister added is preferably from 0.2 to 8 parts by mass, and more preferably from 0.5 to 4 parts by mass, per 100 parts by mass of the rubber component.

The rubber composition for a side reinforcing rubber part can contain a filler such as carbon black and/or silica. The amount of the filler added is preferably from 20 to 100 parts by mass, more preferably from 30 to 80 parts by mass, and still more preferably from 50 to 70 parts by mass, per 100 parts by mass of the rubber component. The filler is preferably carbon black alone or a blend of carbon black and silica, and more preferably carbon black. The value of tensile stress of the rubber composition can be controlled by the kind and amount of the filler added. Carbon black is not particularly limited, and carbon blacks ISAF Grade (N200s), HAF Grade (N300s), FEF Grade (N500s) and GPF Grade (N600s) (all is ASTM Grade) can be used. Carbon black FEF Grade is more preferred.

The rubber composition for a side reinforcing rubber part can contain various additives generally used in a rubber composition for a tire, such as an oil, zinc flower, stearic acid, a wax, a vulcanizing agent and a vulcanization accelerator, other than the components described above. The vulcanizing agent includes a sulfur component such as powdered sulfur, precipitated sulfur, colloidal sulfur, insoluble sulfur and highly dispersible sulfur. Although not particularly limited, the amount of the vulcanizing agent added is preferably from 0.1 to 10 parts by mass, more preferably from 0.5 to 8 parts by mass, and still more preferably from 1 to 5 parts by mass, per 100 parts by mass of the rubber component. The amount of the vulcanization accelerator added is preferably from 0.1 to 7 parts by mass, and more preferably from 0.5 to 5 parts by mass, per 100 parts by mass of the rubber component.

The rubber composition for a side reinforcing rubber part can be prepared by kneading necessary components according to the conventional method using a mixing machine such as Banbury mixer, kneader or rolls, generally used. The rubber composition contains the phenol type thermosetting resin and the methylene donor in the mass ratio described above, and further contains at least two kinds of age resistors including a quinoline type age resister. This embodiment increases tensile stress at high temperature, making it easy to set the M50H/M50N ratio to the above-described range, and can remarkably improve nm flat durability.

In the run flat tire according to the present embodiment, a rubber composition satisfying the following relationship is used as the rubber composition forming the covering rubber of the carcass ply (5) and the bead filler (7). That is, when 10% vulcanization time at a vulcanization temperature of 160° C. of the rubber composition for a covering rubber is $t_{p10}$ (min) and 10%/vulcanization time at a vulcanization temperature of 160° C. of the rubber composition for a bead filler is $t_{b10}$ (min), $t_{b10}/t_{p10}$ that is a ratio of those satisfies the following relationship.

$$0.5 \leq t_{b10}/t_{p10} \leq 1.0$$

For the prevention of separation between a bead filler and a carcass ply, vulcanization rate in the initial stage of vulcanization is important, and covulcanizability can be improved by matching the degree of progress of vulcanization in the initial stage. The bead filler is difficult to transmit heat during vulcanization, but by matching vulcanization initiation time by satisfying the above relationship, separation between a bead filler and a carcass ply can be suppressed. In detail, since the bead filler has thickness, vulcanization of the bead filler takes longer time as compared with that of the carcass ply. For this reason, when the ratio is 1.0 or less, inclusion of bubbles and deterioration of heat resistant adhesiveness due to the fact that the carcass ply is precedingly vulcanized can be reduced. Furthermore, when the ratio is 0.5 or more, vulcanization initiation of the bead filler is prevented from being too early, and occurrence of separation by deterioration of heat resistant adhesiveness can be suppressed. The $t_{b10}/t_{p10}$ is preferably 0.6 or more, and is preferably 0.9 or less.

When decrease of rigidity of the side reinforcing rubber part (8) at high temperature is suppressed by specifying M50H/M50N as above, failure in the side reinforcing rubber part (8) during run flat running is suppressed. However, stress applied to the bead part (3) is increased during run flat running, and separation is easy to occur between the bead filler (7) and the carcass ply (5). In contrast, according to the present embodiment, separation between the bead filler and the carcass ply can be suppressed by specifying the $t_{b10}/t_{p10}$. For this reason, failure in the bead part (3) is suppressed, and run flat durability can be further improved.

In the rubber composition for a covering rubber and the rubber composition for a bead filler, the rubber component is not particularly limited, and natural rubber or a blend rubber of natural rubber and styrene-butadiene rubber may be used. The proportion of natural rubber occupied in the rubber component is preferably 50 mass % or more. Those rubber compositions can contain a filler such as carbon black. The amount of the filler added may be from 30 to 120 parts by mass, and may be from 40 to 100 parts by mass, per 100 parts by mass of the rubber component. Various additives such as an oil, zinc flower, stearic acid, an age resister, a vulcanizing agent and a vulcanization accelerator can be added to those rubber compositions. The phenol type thermosetting resin as described above may be added to the rubber composition for a bead filler, thereby rigidity can be increased. The amount of the phenol type thermosetting resin added is not particularly limited, and may be from 1 to 20 parts by mass, and may be from 5 to 15 parts by mass, per 100 parts by mass of the rubber component.

The $t_{p10}$ and $t_{b10}$ of the rubber composition for a covering rubber and the rubber composition for a bead filler can be adjusted by the kind of a vulcanizing agent and a vulcanization accelerator, the amount of those added per 100 parts by mass of the rubber component, and the combination thereof. The amount of sulfur added as a vulcanizing agent is not particularly limited. The amount is preferably from 3 to 10 parts by mass per 100 parts by mass of the rubber component in the rubber composition for a bead filler, and is preferably from 0.5 to 5 parts by mass per 100 parts by mass of the rubber component in the rubber composition for a covering rubber. Those rubber compositions can be prepared by kneading necessary components according to the conventional method using a mixing machine such as Banbury mixer, kneader or rolls, generally used.

The method for producing a run flat tire according to the present embodiment has the characteristic in the rubber composition used in the side reinforcing rubber part (8), the covering rubber of the carcass ply (5), and the bead filler (7), and for methods other than this, the conventional method for producing a run flat tire can be applied. That is, a side reinforcing rubber part is formed using the above-mentioned rubber composition for a side reinforcing rubber part, and a carcass ply and a bead filler are formed using the above-mentioned rubber composition for a covering rubber and the above-mentioned rubber composition for a bead filler, respectively. Specifically, an unvulcanized side reinforcing rubber member is prepared using the rubber composition for a side reinforcing rubber part, an unvulcanized carcass ply member is prepared together with a carcass cord using the rubber composition for a covering rubber, and an unvulcanized bead filler member is prepared using the rubber composition for a bead filler. Unvulcanized tire (green tire) is formed using those members together with other unvulcanized tire member. The green tire obtained is set in a mold, and vulcanization molded at 140 to 180° C. Thus, a run flat tire is obtained.

EXAMPLES

The invention is described in detail by reference to the following examples, but it should be understood that the invention is not construed as being limited to those examples.

Preparation and Evaluation of Rubber Composition

Components excluding sulfur, a vulcanization accelerator and a methylene donor were mixed according to the formulation (parts by mass) shown in Table 1 below using Banbury mixer in a first step (nonproductive mixing step) (discharge temperature: 160° C.). Sulfur, a vulcanization accelerator and a methylene donor were then mixed with the thus-obtained mixture in a second step (final mixing step) (discharge temperature: 1000° C.). Thus, a rubber composition for a side reinforcing rubber part was prepared. Similarly, a rubber composition for a covering rubber of a carcass ply and a rubber composition for a bead filler were prepared according to the formulations (parts by mass) shown in Table 2 below.

Details of each component in Tables 1 and 2 are as follows.

NR: Natural rubber, RSS #3
BR: "BR01" manufactured by JSR Corporation
SBR: "SBR1502" manufactured by JSR Corporation
Carbon black: N550, "SEAST SO" manufacture by Tokai Carbon Co., Ltd.
Oil: "JOMO PROCESS NC140" manufactured by JX Nippon Sun-Energy Corporation
Stearic acid: "LUNAC S-20" manufactured by Kao Corporation
Phenol type resin: Oil-modified novolac phenol resin, "SUMILITE RESIN PR13349" manufactured by Sumitomo Bakelite Co., Ltd.
Zinc flower: "Zinc Flower Grade 1" manufactured by Mitsui Mining & Smelting Co., Ltd.
Age resister 1: N-phenyl-N'-(1,3-dimethylbutyl)p-phenylenediamine, "ANTIGEN 6C" manufactured by Sumitomo Chemical Co., Ltd.
Age resister 2: 2,2,4-Trimethyl-1,2-dihydroquinoline polymer (TMDQ), "ANTAGE RD" manufactured by Kawaguchi Chemical Industry Co., Ltd.
Vulcanization accelerator 1: "NOCCELER NS-P" manufactured by Ouchi Shinko Chemical Industrial Co., Ltd.
Vulcanization accelerator 2: "SANCELER DM-G" manufactured by Sanshin Chemical Industry Co., Ltd.
Methylene donor: Hexamethoxymethylmelamine, "CYREZ 964RPC" manufactured by Mitsui Cytech Ltd.
Sulfur: "MU-CRON OT-20" manufactured by Shikoku Chemicals Corporation Using a test piece having a thickness of 2 mm vulcanized at 160° C. for 25 minutes of the rubber composition for a side reinforcing rubber part, tensile stress (M50N) in 50% elongation at 23° C. and tensile stress (M50H) in 50% elongation at 100° C. were measured by the following method, and a ratio of those (M50H/M50N) was obtained.

Tensile stress in 50% elongation at 23° C.: According to JIS K6251, a test piece of dumbbell shape No. 3 was subjected to a tensile test at a room temperature of 23° C., and tensile stress in 50% elongation was obtained.

Tensile stress in 50% elongation at 100° C.: According to JIS K6251, a test piece of dumbbell shape No. 3 was maintained in a thermostat bath of 100° C. for 1 hour or more, a tensile test was then conducted in an atmosphere of 100° C. by a tensile tester equipped with a thermostat bath, and tensile stress in 50% elongation was obtained.

As shown in Table 1, in the formulation 1 that is a control, M50H/M50N that is a ratio between tensile stress at ordinary temperature and tensile stress at high temperature is 0.9, and rigidity was decreased at high temperature. In the formulation 2, as compared with the formulation 1, decrease of tensile stress at high temperature was not observed by increasing the amount of carbon black and adding a phenol type resin and a methylene donor, but increase of rigidity is too large, and M50H/M50N exceeded 1.3. In contrast, in the formulations 3 to 6 in which given amounts of a phenol type resin and a methylene donor were added and two or more kinds of age resisters including a quinoline type age resister were added, the ratio of M50H/M50N could be fallen within a range of from 1.1 to 1.2 by increasing tensile stress at high temperature.

Regarding the rubber composition for a covering rubber of a carcass ply and the rubber composition for a bead filler, 10% vulcanization time at a vulcanization temperature of 160° C. was measured by the following method. The results obtained are shown in Table 2.

10% Vulcanization times $t_{p10}$ and $t_{b10}$: According to JIS K6300-2, a vulcanization curve of a rubber composition was measured at 160° C. Maximum value (Fmax) and minimum value (Fmin) of a torque in the vulcanization curve were measured, and time (min) until reaching a torque of {(Fmax−Fmin)×0.1+Fmin} was defined as 10% vulcanization time.

TABLE 1

| | Formulation (parts by mass) | | | | | |
|---|---|---|---|---|---|---|
| | Formulation 1 | Formulation 2 | Formulation 3 | Formulation 4 | Formulation 5 | Formulation 6 |
| NR | 40 | 40 | 40 | 40 | 40 | 40 |
| BR | 60 | 60 | 60 | 60 | 60 | 60 |
| Carbon black | 60 | 72 | 60 | 60 | 60 | 65 |
| Stearic acid | 2 | 2 | 2 | 2 | 2 | 2 |
| Phenol type resin | | 7 | 3 | 7 | 3 | 3 |
| Zinc flower | 3 | 3 | 3 | 3 | 3 | 3 |
| Age resister 1 | 1.5 | 1.5 | 1.5 | 1.5 | 1.5 | 1.5 |
| Age resister 2 | | | 1.5 | 1.5 | 0.5 | 4 |
| Vulcanization accelerator 1 | 2 | 2 | 2 | 2 | 2 | 2 |
| Methylene donor | | 2 | 1 | 2 | 1 | 1 |
| Sulfur | 4 | 4 | 4 | 4 | 4 | 4 |
| M50H (MPa) | 2.8 | 6.2 | 4.5 | 5.1 | 4.5 | 5.0 |
| M50H/M50N | 0.9 | 1.4 | 1.1 | 1.2 | 1.1 | 1.2 |

TABLE 2

| | Rubber composition for covering rubber of carcass ply | | Rubber composition for bead filler | |
|---|---|---|---|---|
| | Formulation (parts by mass) | | | |
| | Formulation A | Formulation B | Formulation C | Formulation D |
| NR | 100 | 100 | 80 | 80 |
| SBR | | | 20 | 20 |
| Carbon black | 50 | 50 | 75 | 75 |
| Oil | 10 | 10 | 5 | 5 |
| Stearic acid | 2 | 2 | 2 | 2 |
| Phenol type resin | | | 10 | 10 |
| Zinc flower | 2 | 2 | 5 | 5 |
| Age resister 1 | 1 | 1 | | |
| Age resister 2 | | | 1 | 1 |
| Vulcanization accelerator 1 | 1 | 1 | 1.5 | 1.5 |
| Vulcanization accelerator 2 | | 0.2 | | 0.5 |
| Sulfur | 2 | 2 | 5 | 5 |
| 10% Vulcanization time (min) | 3.7 | 2.5 | 3.2 | 1.5 |

Preparation and Evaluation of Tire

The rubber composition for a side reinforcing rubber part shown in Table 1 and the rubber compositions for a bead filler and a covering rubber shown in Table 2 were used as shown in Table 3 below, and a radial tire (tire size: 245/40ZR18) having the structure shown in FIG. 1 was vulcanization molded according to the conventional method. Each tire had the same constitution, except for a side reinforcing rubber part, a bead filler and a covering rubber. In the carcass ply (5), each ply was made of 21 ends of rayon cord (1840 dtex/3) for 25 mm, and the thickness of the covering rubber was 1.2 mm.

Run flat durability and running performance to run over a rut of each tire obtained were evaluated. Each evaluation method is as follows.

Run flat durability: Drum tester having a smooth surface and a diameter of 1,700 mm and made of iron was used. Tire inner pressure was 0 kPa, and load was 65% of loading capacity corresponding to load index. Speed was increased to 80 km/h in 5 minutes from test start, and a tire was run on the drum tester until tire failure occurs in a speed of 80 km/h. Running distance until the failure occurs was indicated by an index when the value of Comparative Example 1 was taken as 100. Larger index means that the run flat durability is more excellent. Furthermore, a tire after the run flat durability test was disassembled and failure site was examined. In Table 3, "SW" means failure in a side reinforcing rubber part and "BC" means separation between a bead filler and a carcass ply.

Figure 2:
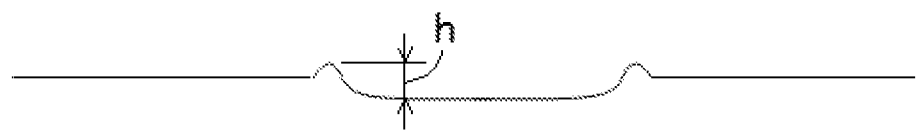
FIG. 2 is a cross-sectional view of a test road used in evaluation of running performance to run over a rut.

Running performance to run over a rut: Test tires having an inner pressure of 200 kPa and assembled to standard rims were mounted on front wheels of a test vehicle, and running performance of tires to run over a rut was sensorially evaluated on a test road (height difference of rut: 20 mm) having a cross-sectional shape shown in FIG. 2 that simulates a rut of general road. Tire that smoothly runs over a rut was defined as A, a tire that is slightly difficult to run over a rut was defined as B, and a tire that is difficult to run over a rut was defined as C.

The results obtained are shown in Table 3 below.

durability test, and durability was poor. In contrast, in Examples 1 to 5, run flat durability was remarkably improved without deterioration of running performance to run over a rut.

As described above, according to the present embodiment, the side reinforcing rubber part is constituted using the rubber composition having tensile stress at high temperature that is equal to or more than tensile stress at ordinary temperature, and additionally, vulcanization characteristics between the bead filler and the covering rubber of the carcass are specified. By this, excessive deformation of the side wall part can be suppressed during run flat running, and additionally, the separation between the bead filler and the carcass ply can be suppressed during running. Therefore, run flat durability can be improved.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

TABLE 3

|  | Comparative Example 1 | Comparative Example 2 | Comparative Example 3 | Comparative Example 4 | Comparative Example 5 | Example 1 | Example 2 | Example 3 | Example 4 | Example 5 |
|---|---|---|---|---|---|---|---|---|---|---|
| Side reinforcing rubber part | | | | | | | | | | |
| Formulation | Formulation 1 | Formulation 1 | Formulation 2 | Formulation 3 | Formulation 3 | Formulation 3 | Formulation 3 | Formulation 4 | Formulation 5 | Formulation 6 |
| M50H (MPa) | 2.8 | 2.8 | 6.2 | 4.5 | 4.5 | 4.5 | 4.5 | 5.1 | 4.5 | 5.0 |
| M50H/M50N | 0.9 | 0.9 | 1.4 | 1.1 | 1.1 | 1.1 | 1.1 | 1.2 | 1.1 | 1.2 |
| Covering rubber of carcass ply | | | | | | | | | | |
| Formulation | Formulation B | Formulation A | Formulation A | Formulation A | Formulation B | Formulation A | Formulation B | Formulation A | Formulation A | Formulation A |
| $t_{p10}$ (min) | 2.5 | 3.7 | 3.7 | 3.7 | 2.5 | 3.7 | 2.5 | 3.7 | 3.7 | 3.7 |
| Bead filler | | | | | | | | | | |
| Formulation | Formulation C | Formulation C | Formulation C | Formulation D | Formulation C | Formulation C | Formulation D | Formulation C | Formulation C | Formulation C |
| $t_{b10}$ (min) | 3.2 | 3.2 | 3.2 | 1.5 | 3.2 | 3.2 | 1.5 | 3.2 | 3.2 | 3.2 |
| $t_{b10}/t_{p10}$ | 1.28 | 0.86 | 0.86 | 0.41 | 1.28 | 0.86 | 0.60 | 0.86 | 0.86 | 0.86 |
| Run flat durability | 100 | 98 | 103 | 102 | 104 | 115 | 114 | 118 | 109 | 120 |
| Failure site | SW | SW | SW | BC | BC | SW | BC | SW | SW | SW |
| Running performance to run over rut | A | A | A | A | A | A | A | A | A | A |

In Comparative Example 1, M50H/M50N of the side reinforcing rubber part was out of the range, 10% vulcanization time ratio of the bead filler and the carcass ply was also out of the range, failure was observed in the side reinforcing rubber part in the run flat durability test, and durability was poor. In Comparative Examples 2 and 3, 10% vulcanization time ratio of the bead filler and the carcass ply was within the range, but M50H/M50N of the side reinforcing rubber part was out of the range, failure was observed in the side reinforcing rubber part in the run flat durability test, and durability was poor. In Comparative Examples 4 and 5, M50H/M50N of the side reinforcing rubber part was within the range, but 10% vulcanization time ratio of the bead filler and the carcass ply was out of the range, separation between the bead filler and the carcass ply occurred in the run flat

What is claimed is:

1. A run flat tire comprising a tread part, a pair of side wall parts extending inside in a radial direction from both ends of the tread part, a pair of bead parts provided inside in a radial direction of the side wall part, a pair of ring-shaped bead cores provided in the bead parts, a carcass ply comprising a carcass cord and a covering rubber, extending in a toroidal shape between a pair of the bead cores, a bead filler provided on the periphery of the bead cores, and a side reinforcing rubber part provided in the side wall part and reinforcing the side wall part, wherein the side reinforcing rubber part is formed by a rubber composition in which a ratio (M50H/M50N) of tensile stress (M50H) in 50% elongation at a measurement temperature of 100° C. to tensile stress (M50N) in 50% elongation at a measurement temperature of 23° C. is from 1.0 to 1.3, a ratio ($t_{b10}/t_{p10}$) of 10% vulcanization time ($t_{b10}$) at a vulcanization temperature of 160° C. of a rubber composition for the bead filler to 10% vulcanization time ($t_{p10}$) at a vulcanization temperature of 160° C. of a rubber composition for the covering rubber of the carcass ply is from 0.5 to 0.9; and the rubber composition for the bead filler is not the same as the rubber composition for the covering rubber of the carcass ply.

2. The run flat tire according to claim 1, wherein the tensile stress (M50H) in 50% elongation at a measurement temperature of 100° C. of the rubber composition forming the side reinforcing rubber part is 3.5 MPa or more.

3. The run flat tire according to claim 1, wherein the rubber composition forming the side reinforcing rubber part comprises a rubber component containing natural rubber and polybutadiene rubber, a phenol type thermosetting resin and a methylene donor as its hardener, and a mass ratio of the amount of the phenol type thermosetting resin to the amount of the methylene donor is 1.5 times or more.

4. The run flat tire according to claim 3, wherein the rubber component comprises from 20 to 70 mass % of a natural rubber and from 30 to 80 mass % of polybutadiene rubber.

5. The run flat tire according to claim 3, wherein the phenol type thermosetting resin is at least one selected from the group consisting of a straight phenol resin, an alkyl-substituted phenol resin, a resorcin-formaldehyde resin, a resorcin-alkyl phenol copolycondensated formaldehyde resin and oil-modified resins of those, and the methylene donor is at least one selected from the group consisting of hexamethylenetetramine, hexamethoxymethylmelamine, hexamethylolmelamine pentamethyl ether and polyhydric methylolmelamine.

6. The run flat tire according to claim 3, wherein the rubber composition forming the side reinforcing rubber part further comprises a quinoline type age resister and at least one age resister other than the quinoline type age resister.

7. The run flat tire according to claim 6, wherein the quinoline type age resister is at least one selected from the group consisting of 2,2,4-trimethyl-1,2-dihydroquinoline polymer and 6-ethoxy-2,2,4-trimethyl-1,2-dihydroquinoline, and at least one age resister other than the quinoline type age resister is an aromatic secondary amine type age resister.

8. The run flat tire according to claim 7, wherein the aromatic secondary amine type age resister is a p-phenylenediamine type age resister.

9. A method for producing a run flat tire, wherein the run flat tire comprises a tread part, a pair of side wall parts extending inside in a radial direction from both ends of the tread part, a pair of bead parts provided inside in a radial direction of the side wall part, a pair of ring-shaped bead cores provided in the bead parts, a carcass ply comprising a carcass cord and a covering rubber, extending in a toroidal shape between a pair of the bead cores, a bead filler provided on the periphery of the bead cores, and a side reinforcing rubber part provided in the side wall part and reinforcing the side wall part, the method comprising:

preparing an unvulcanized side reinforcing rubber member using a rubber composition having, as a vulcanized rubber property, a ratio (M50H/M50N) of tensile stress (M50H) in 50% elongation at a measurement temperature of 100° C. to tensile stress (M50N) in 50% elongation at a measurement temperature of 23° C. of from 1.0 to 1.3, preparing an unvulcanized carcass ply member and an unvulcanized bead filler member using a rubber composition for the covering rubber and a rubber composition for the bead filler, satisfying that when 10% vulcanization times at a vulcanization temperature of 160° C. of the rubber composition for the covering rubber and the rubber composition for the bead filler are $t_{p10}$ and $t_{b10}$, respectively, a ratio ($t_{b10}/t_{p10}$) of those is from 0.5 to 0.9, and the rubber composition for the bead filler is not the same as the rubber composition for the covering rubber of the carcass ply, forming a green tire using the side reinforcing rubber member, the carcass ply member and the bead filler member, and vulcanization molding the green tire.

10. The method according to claim 9, wherein the rubber composition used in the side reinforcing rubber part comprises a rubber component containing natural rubber and polybutadiene rubber, a phenol type thermosetting resin and a methylene donor as its hardener, and a mass ratio of the amount of the phenol type thermosetting resin to the amount of the methylene donor is 1.5 times or more.

11. The run flat tire according to claim 1, wherein the rubber composition for the bead filler comprises 100 parts by mass of the rubber component and from 1 to 20 parts by mass of a phenol type thermosetting resin, and the rubber composition for the covering rubber of the carcass ply does not contain a phenol type thermosetting resin.

12. The run flat tire according to claim 1, wherein the rubber composition for the bead filler comprises 100 parts by mass of the rubber component and from 3 to 10 parts by mass of sulfur, and the rubber composition for the covering rubber of the carcass ply comprises 100 parts by mass of the rubber component and from 0.5 to 5 parts by mass of sulfur, the sulfur content in the rubber composition for the bead filler being higher than the sulfur content in the rubber composition for the covering rubber of the carcass ply.

13. The method according to claim 9, wherein the rubber composition for the bead filler comprises 100 parts by mass of the rubber component and from 1 to 20 parts by mass of a phenol type thermosetting resin, and the rubber composition for the covering rubber of the carcass ply does not contain a phenol type thermosetting resin.

14. The method according to claim 9, wherein the rubber composition for the bead filler comprises 100 parts by mass of the rubber component and from 3 to 10 parts by mass of sulfur, and the rubber composition for the covering rubber of the carcass ply comprises 100 parts by mass of the rubber component and from 0.5 to 5 parts by mass of sulfur, the sulfur content in the rubber composition for the bead filler being higher than the sulfur content in the rubber composition for the covering rubber of the carcass ply.

* * * * *